(12) United States Patent
Pierce et al.

(10) Patent No.: US 7,036,052 B2
(45) Date of Patent: Apr. 25, 2006

(54) REMOTE ERROR DETECTION BY PRESERVING ERRORS GENERATED THROUGHOUT A SOFTWARE STACK WITHIN A MESSAGE

(75) Inventors: Shaun D. Pierce, Redmond, WA (US); Ferhan Elvanoglu, Redmond, WA (US); Mark H. Lucovsky, Sammamish, WA (US); Arthur Zwiegincew, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 582 days.

(21) Appl. No.: 10/277,446

(22) Filed: Oct. 22, 2002

(65) Prior Publication Data

US 2003/0079168 A1    Apr. 24, 2003

Related U.S. Application Data

(60) Provisional application No. 60/339,608, filed on Oct. 22, 2001, provisional application No. 60/339,490, filed on Oct. 22, 2001.

(51) Int. Cl.
*G06F 11/00* (2006.01)

(52) U.S. Cl. ............................ 714/57; 714/38; 717/124
(58) Field of Classification Search ................. 714/38, 714/48, 57; 717/124, 125
See application file for complete search history.

(56) References Cited

U.S. PATENT DOCUMENTS

| | | | | | |
|---|---|---|---|---|---|
| 5,862,322 | A | * | 1/1999 | Anglin et al. | 714/57 |
| 5,970,248 | A | * | 10/1999 | Meier | 717/125 |
| 5,974,568 | A | * | 10/1999 | McQueen | 714/38 |
| 6,090,154 | A | * | 7/2000 | Jeffries et al. | 717/125 |
| 6,735,721 | B1 | * | 5/2004 | Morrow et al. | 714/57 |
| 6,892,379 | B1 | * | 5/2005 | Huang | 717/140 |

OTHER PUBLICATIONS

Microsoft Press Computer Dictionary Third Edition, "stack", Microsoft Press, 1997, p. 447.*

* cited by examiner

*Primary Examiner*—Scott Baderman
*Assistant Examiner*—Gabriel L. Chu
(74) *Attorney, Agent, or Firm*—Workman Nydegger (57) ABSTRACT

A client sends a message to a server computer system over a network. Upon receiving the message either from the client or from a local process, the server passes the message down through a software stack to a lower layer module that is capable of detecting errors in the message. That lower layer module then detects an error and inserts error information that represents the error into an error reporting data structure. The lower layer also inserts potential text remedy information on how to correct the error. The module that detected the error then returns and passes the error reporting data structure back up through the software stack. The server then sends the response to the message along with the text field that includes the text error information back to the client computing system or other local requesting process.

19 Claims, 4 Drawing Sheets

REMOTE ERROR DETECTION BY PRESERVING ERRORS GENERATED THROUGHOUT A SOFTWARE STACK WITHIN A MESSAGE

CROSS-REFERENCE TO RELATED APPLICATION

The present application claims priority to commonly-assigned, co-pending, U.S. provisional application serial No. 60/339,608, filed Oct. 22, 2001, which is entitled "Identity-Based Service Fabric", which provisional application is incorporated herein by reference in its entirety. The present application also claims priority to commonly-assigned, co-pending, U.S. provisional application serial No. 60/339,490, filed Oct. 22, 2001, which is entitled "Identity-Based Service Communication Using XML Messaging Interfaces", which provisional application is incorporated herein by reference in its entirety.

BACKGROUND OF THE INVENTION

1. The Field of the Invention

The present invention relates to computer error detection, and more specifically, to mechanisms for preserving specific errors messages that were generated in a software stack even if the error message was generated deep within the software stack.

2. Background and Relevant Art

Computing technology has revolutionized the way people work and play and has contributed enormously to the advancement of humankind. Computers now aid in enumerable applications such as word processing, computer simulations, advanced gaming, voice recognition, among many more. The functionality of computers is, however, directed by the software that runs on the computer.

Software packages can be quite complex often involving many thousands of lines of source code. Even if the source code is compiled or is interpreted properly into computer-executable binary instructions, the software may still not perform as intended by the software designer. Also, when a local software package interoperates over a network with a remote software package, it is not at all a given that the two software packages may interoperate properly in the first instance. It may take some time and effort to debug the software package to operate properly.

One mechanism that helps greatly in debugging applications is the generation of error messages or codes. Unfortunately, when the software is implements a protocol stack, or interacts with another software package that has a software stack, sometimes more detailed information is lost if the error occurs or is discovered by a lower level in the software stack. For example, when inputting a data structure such as a Simple Object Access Protocol (SOAP) message to a software application, a lower level in the protocol stack may detect a semantic error such as a missing parenthesis that may not be detected by an upper layer in the protocol stack.

When the lower layer completes its processing, it typically returns and its state is destroyed in memory. The lower layer typically generates a specific error message that is lost when the lower layer is destroyed. The next upper layer in the software stack may generalize the error or perhaps not even register that an error occurred at all. As the error information is passed up the software stack, and as the software stack is destroyed, the error information may be entirely lost, or generalized to the point that it is difficult to detect what the error was and how to correct it. For example, the fact that the lower layer detected a missing parenthesis may be generalized to an "access denied" or a "general protection fault" at the upper levels in the software stack.

BRIEF SUMMARY OF THE INVENTION

The foregoing problems with the prior state of the art are overcome by the principles of the present invention, which are directed towards methods, systems, computer program products, and data structures for passing specific error messages from lower layers in a software stack through to the upper layers of the software stack, so that the user may be more apprised of the specific error message generated by the lower layer. In addition to the detailed error information, the lower layers of the software module may also provide human-readable suggestions for solving the error. Accordingly, the user is in a better position to identify and correct the error whether that error was caused by a defect in the lower layer, or whether the error was generated due to a non-conformity of a data structure passed into the lower layer.

The error information may be entered into a message that had previously been received from a client computer system or from another process running within the same computer system. Alternatively, the error information may be entered into a different data structure than the received message. A response to the message, or the message itself, may be returned to the client computer system along with the detailed text error information, and potentially also the text describing potential remedies. According, the user at the client computer system (or the local requesting process) is more apt to know what the error is, and may even be made apprised of potential remedies. These remedies were inserted by a specific layer of the software stack and thus may be specifically designed by the code drafter of that layer of the software stack. Accordingly, the remedies may be quite helpful and to the point indeed. Also, since the text error information is provided within a response to a potentially remotely issued message, users can remotely determine with specificity what the error is, even if the error occurred in a remote location deep within a software stack.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

A server software stack receives a message issued by a client over a network, or perhaps from a local process running on the same machine. Upon accessing the message, the server passes the message down through a software stack to a module that is capable of detecting errors in the message. That module then detects an error in the message and inserts text error information that represents the error into an editable text field within the message or within a response to the message. Alternatively, the error information is provided in a separate data structure used to contain the error information. The error detection module then returns and passes the data structure (whether it be the received message, a response to the received message, or a separate error data structure) with the error information back up through the software stack. The server then sends the response to the message along with a text field that includes a text form of the error information back to the requesting client computing system or local process.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
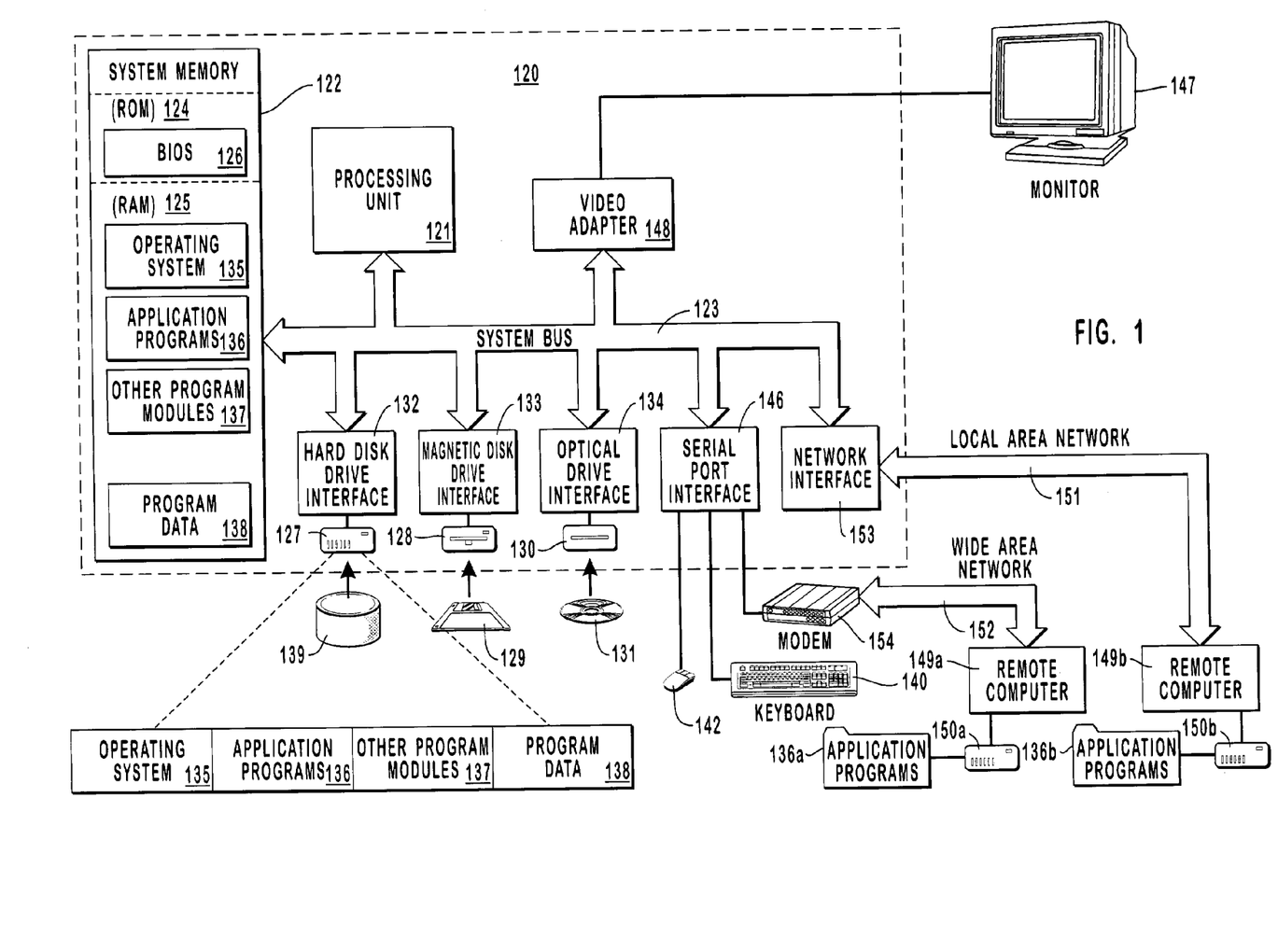
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
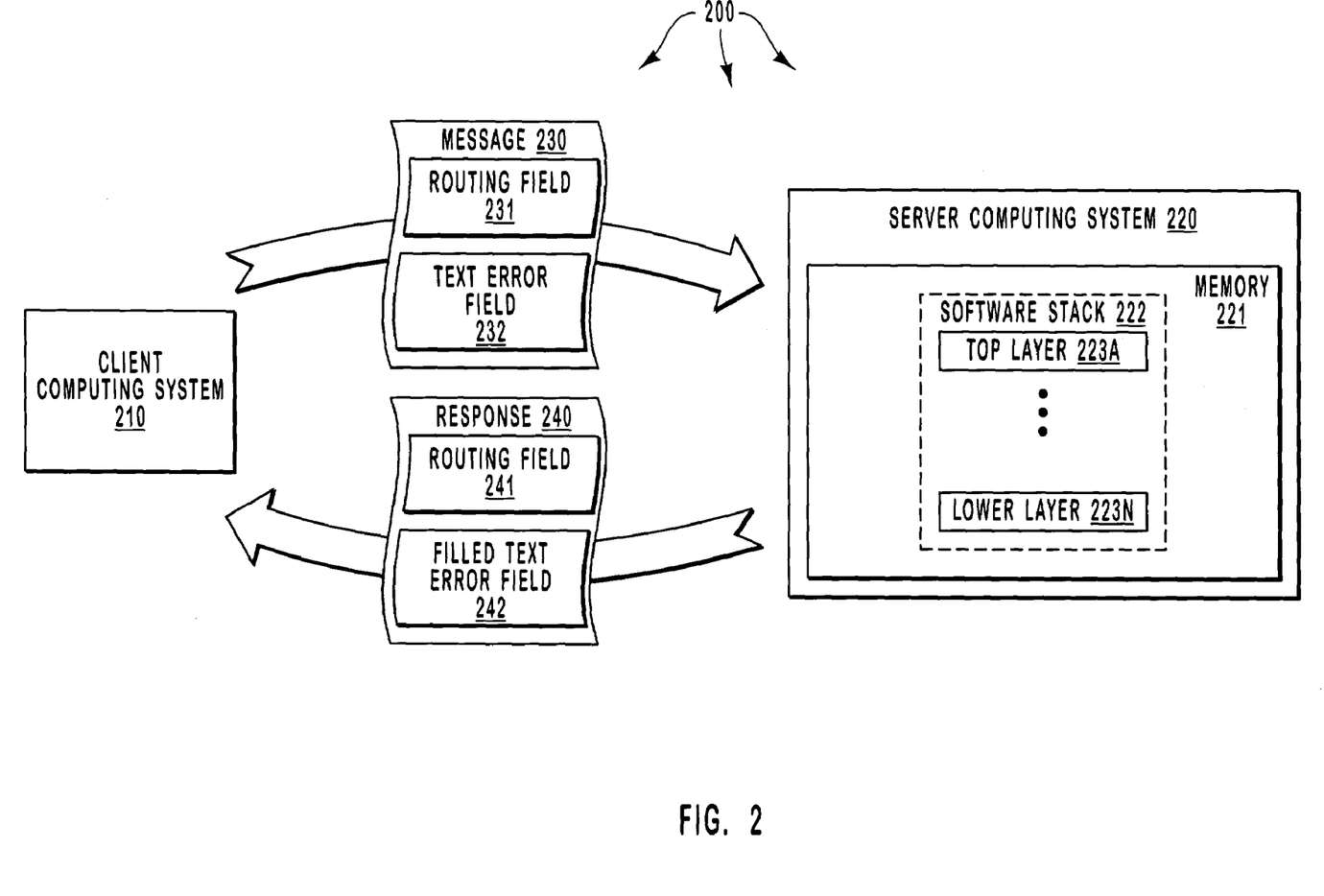
FIG. 2 illustrates a network architecture in which a client may remotely determine an error detected by a particular layer in a remote software stack in accordance with the principles of the present invention.

FIG. 2 illustrates a network architecture 200 that includes a client computing system 210 and a server computing system 220. Although not required, the client computing system 210 and the server computing system 220 may each be structured as described above for computer 120. The terms "client" and "server" are used herein to denote the fact that the client computing system 210 receives a service related to error detection from the server computing system 220. While the client computing system 210 and the server computing system 220 are a client and a server (respectively) in this context, the client computing system 210 may act as a server in another context, and the server computing system 220 may act as a client in another context.

The server computing system 220 includes a memory 221 in which volatile runtime objects may be created and destroyed. In the case in which server computing system 220 is the computer 120 described above, the memory 221 may be, for example, the RAM 125.

It is common for software authors to draft code that, after being compiled and when executed, forms a temporary layered structure called a software stack in memory. For example, the memory 221 includes a software stack 222. The software stack 222 includes a top layer module 223A and a lower layer module 223N with potentially one or more intermediary modules interposed there between as represented by the vertical ellipses 224.

The top layer 223A causes its neighboring lower layer to be created in memory 221 by placing a specified function call. The function call may allow for the inputting of a data structure for use by its neighboring lower layer. That neighboring lower layer may likewise also place a function call to the next neighboring lower layer, and pass in an appropriate data structure for editing by the next neighboring lower layer. This process may repeat until a number of layers are present in the software stack. The lowest level then finishes processing and "returns". This means that the lowest level passes back any resulting data structure to its neighboring upper layer and then its state is destroyed in memory 221. That neighboring upper layer completes processing, passes back any resulting data structure to its neighboring upper layer and then its state is destroyed. This process is repeated until the entire software stack is destroyed except for the top-most layer 223A.

While processing, any of the intermediary layers and the lowest layer may detect errors with any passed in data structures and may even potentially generate error messages or codes. However, in the process of the various layers of the software stack returning, this error information may be lost. Accordingly, when an error occurs with a passed-in data structure, one may only see a very general error message that is not specifically descriptive of the actual error detected.

In accordance with the principles of the present invention, the client computing system 210 sends a message 230 to the server computing system 220. In addition to the usual routing information contained in a routing field 231, the message 230 also potentially includes a text error field 232. For example, if the message 230 were a Simple Object Access Protocol (SOAP) message, the text error field 232 may be a SOAP header field such as a "SOAP-Fault" field. The text error field may have text information inserted therein without otherwise affecting the processing of the message 230.

The server computing system 220 responds by returning a response 240, which may have the same structure as the message 230, except that the routing information in the routing field 241 specifies an appropriate return path. Importantly, the response 240 also includes a filled text error field 242. The filled text error field 242 may be the same as the text error field 232 except that it may contain specific text error information inserted by one or more of the layers in the software stack, even by potentially the lower layer 223N or the intermediary layers 224. The filled text error field 242 may even contain specific text suggestions or instructions for remedying the detected error. These suggestions or instructions may be generated by the actual drafter of the source code that caused the creation in memory of the layer that detected the error. That drafter is most likely going to be very aware of how to fix a detected error and thus the suggestions and instructions within the filled text error field 242 may be most useful to a user of the client computing system 210 in identifying and remedying the error.

The network environment of FIG. 2 is provided by way of illustration only, and not by way of limitation. The message sent for processing in the software stack may not be from another computer system at all, but may be from a process running within the server computing system 220. Regardless of whether a remote client or a local process issues the message, the process by which the server computing system 220 fills the filled text error field 242 or otherwise provides text error information in a response to the message is described with respect to the method 300 of FIG. 3. The server computing system 220 performs an act of accessing a message from a requesting entity (act 301). In the network environment 200 of FIG. 2, this may include receiving the message 230 over a network. However, as previously mentioned, this may also include receiving the message 230 from a local process running on the server computing system 220. The server computing system 220 then perform a functional result-oriented step for preserving error information generated within a software stack (step 310). The step 310 may include any corresponding acts for accomplishing the specified function. However, in FIG. 3, the step 310 includes corresponding acts 311, 312, 313 and 314.

Figure 3:
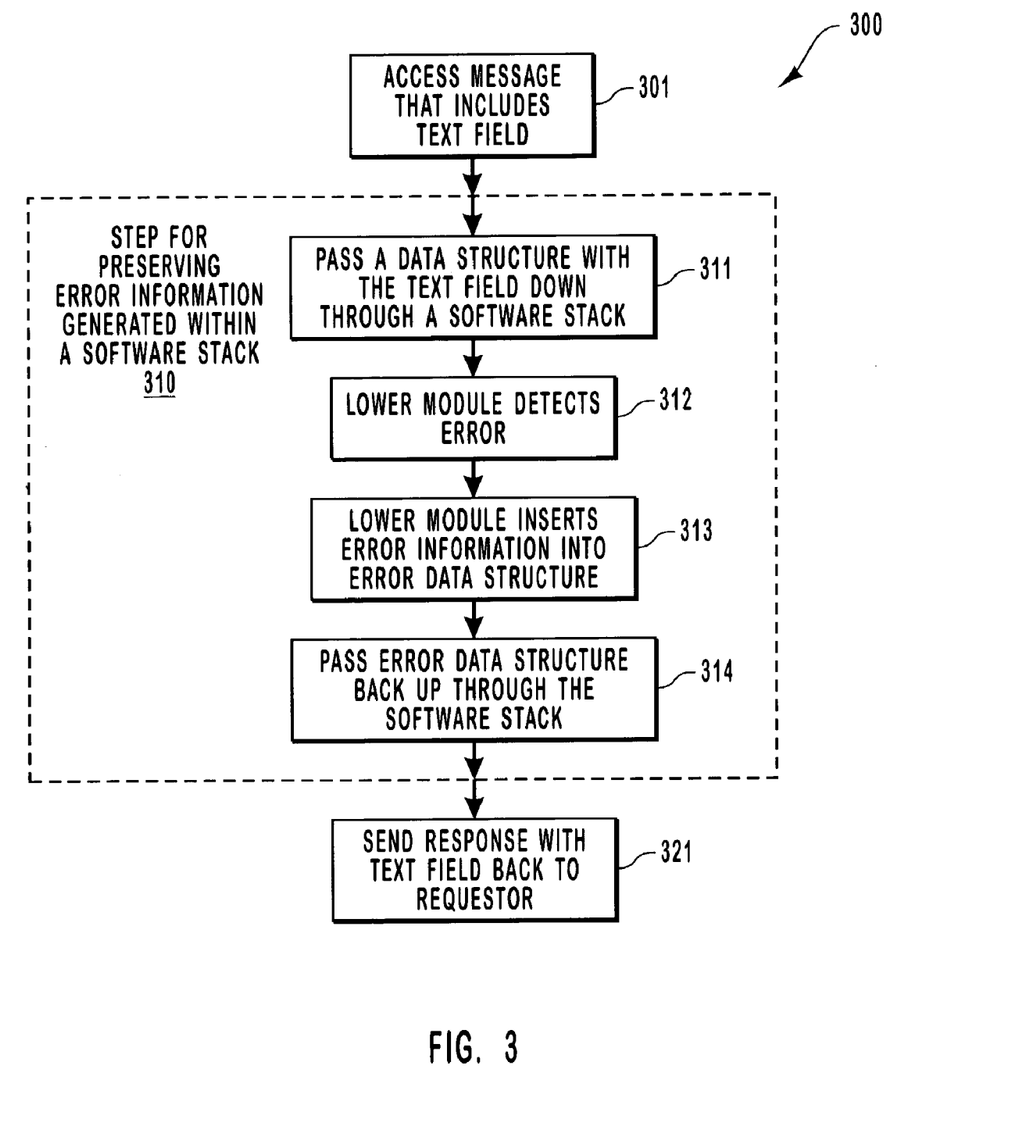
FIG. 3 illustrates a flowchart of a method for allowing a client to review detailed error information in accordance with the principles of the present invention.

More specifically, the step 310 includes an act of passing a data structure that represents at least a portion of the received message down through a software stack to a module that is capable of detecting errors in the data structure (act 311). The data structure may be, for example, the message 230 itself, or a portion thereof. Furthermore, although not required, the data structure may also include an error field that the software layers may insert error information into. The step 310 then includes an act of the lower module detecting an error with the data structure (act 312) followed by an act of the lower module inserting error information (and potentially suggested or instructed remedies) that represents the error into an error data structure (act 313). If the message 230 were to include a text error field 232 as illustrated in FIG. 2, the error data structure may be the text error field 232 itself. Alternatively, the error data structure may be a text field in the response, or perhaps a separate data structure altogether from the message or the response to the message. Regardless of its form, the lower module then returns and the error data structure is passed with the inserted error information back up the software stack (act 314).

After the step 310 completes, the method 300 includes an act of sending a response to the message along with the text field that includes a text representation of the error information back to the requesting entity (act 321). The text error information may be the same as the error information if the lower error detection module is capable of generating and inserting text error information into the error data structure. Otherwise, the server computing system 220 may convert non-human readable codes into text information and then insert such text error information into the response.

Figure 4:
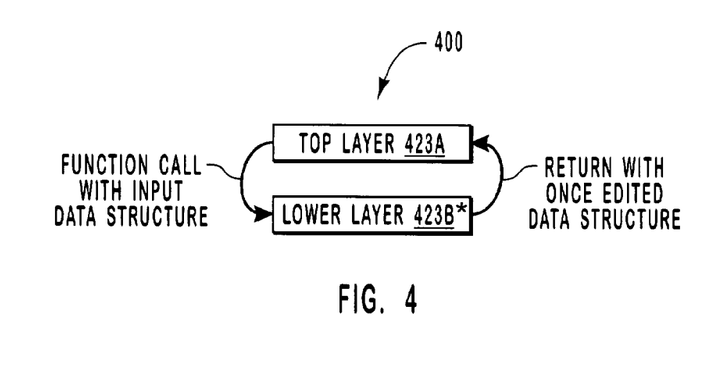
FIG. 4 illustrates a software stack in which the lower layer that detects the error and inserts or provides the text error information is immediately below the top layer in the software stack.
Figure 5:
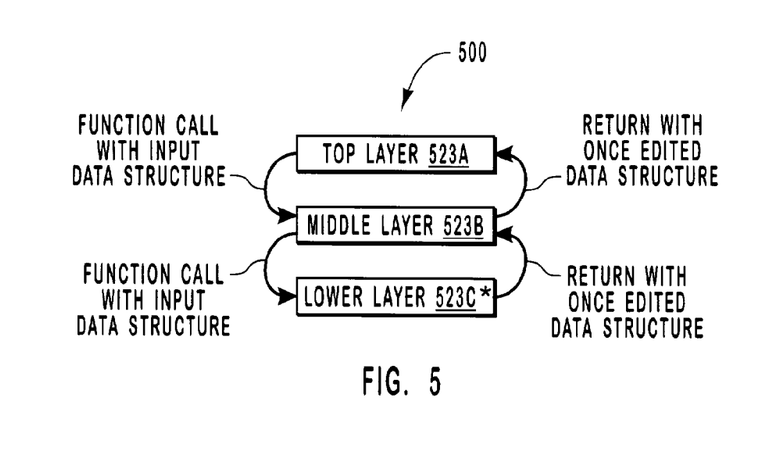
FIG. 5 illustrates a software stack in which the lower layer that detects the error and inserts or provides the text error information is not immediately below the top layer of the software stack.
Figure 6:
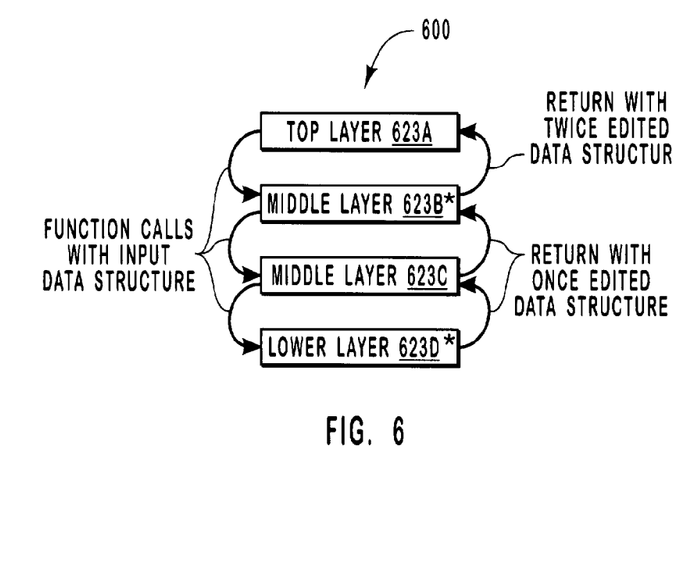
FIG. 6 illustrates a software stack in which multiple layers detect errors and insert or provide text error information.

FIGS. 4 through 6 show various examples of how the step 310 may be implemented in various software stacks.

For example, FIG. 4 illustrates a software stack 400 that includes only a top layer 423A and a lower layer 423B. The top layer places a function call to create the lower layer 423B in memory. Also, the function call inputs the message data structure (in this case with the text error field) into the lower layer 423B. The lower layer 423B then detects an error as represented by the asterisk in the upper left corner of the layer 423B. The lower layer 423B then returns by passing the data structure with the text error field that includes the specific error information back to the top layer 423A, whereupon the state of the lower layer 423B is destroyed in memory 221.

FIG. 5 shows a larger software stack 500 that includes a middle layer 523B in addition to a top layer 523A and the lower layer 523C. The top layer 523A places a function call that creates the middle layer 523B and also passes in the message data structure with the text error field to the middle layer 523B. Likewise, the middle layer 523B places a function call that creates the lower layer 523C and passes in the data structure with the text error field to the lower layer 523C. The lower layer 523C then detects an error as represented by the asterisks, inserts specific error information into the text error field, and then passes the data structure with the edited text error field back to the middle layer 523B prior to the lower layer 523C being destroyed. The middle layer 523B then passes the data structure with the edited text error field back to the top layer 523A prior to the middle layer 523B being destroyed. The software stack 500 may even be deeper than three layers while still retaining the detailed text error information inserted well down at the bottom of the software stack.

FIG. 6 shows a yet even larger software stack 600 that includes two middle layers 623B and 623C in addition to a top layer 623A and the lower layer 623D. Here, there are multiple layers that detect an error in the message data structure including the lower layer 623D and the middle layer 623B as represented by the asterisks. The top layer 623A places a function call that creates the middle layer 623B and also passes in the message data structure with the text error field to the middle layer 623B. The middle layer 623B places a function call that creates the middle layer 623C and also passes in the data structure with the text error field to the middle layer 623C. The middle layer 623C places a function call that creates the lower layer 623D and passes in the message data structure with the text error field to the lower layer 623D. The lower layer 623D then detects an error, inserts specific error information into the text error field, and then passes the data structure with the edited text error field back to the middle layer 623C prior to the lower layer 623D being destroyed. The middle layer 623C passes the data structure with the edited text error field back to the middle layer 623B prior to the middle layer 623C being destroyed. The middle layer 623B then detects an error, inserts specific error information in the same or a different text error field, and then passes the data structure with both of the text error information inserted by both the lower layer 623D and the middle layer 623B back to the top layer 623A prior to the middle layer 623B being destroyed. Accordingly, in this case, multiple layers in the software stack have contributed error information into the data structure.

Accordingly, the principles of the present invention allow for a requesting entity (even a remote client) to identify an error that was detected deep within a software stack. In addition, the error information is specific and not lost when the lower layers of the software stack return. Furthermore, the text information may include specific suggestions or instructions for remedying the error. Accordingly, the user of the client is able to more quickly and efficiently remove errors from messages sent to the server computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computing system that includes at least one processor and a memory capable of holding run-time software stacks that are created in response to the at least one processor executing computer-executable instructions, a method for reporting detailed error information to a requesting entity regarding errors in a message from the requesting entity, the method comprising the following:
   an act of accessing a message from a requesting entity;
   an act of passing a data structure that represents at least a portion of the received message down through a software stack to a module that is capable of detecting errors in the data structure;
   an act of the module detecting an error with the data structure;
   an act of the module inserting error information that represents the error into an error data structure;
   an act of the error detection module returning and passing the error data structure with the inserted error information back up through the software stack; and
   an act of sending a response to the message along with a text field that includes a text representation of the error information back to the requesting entity.

2. A method in accordance with claim 1, wherein the act of accessing a message from a requesting entity comprises the following:
   an act of receiving the message from a client computing system over a network.

3. A method in accordance with claim 1, wherein the act of accessing a message from a requesting entity comprises the following:
   an act of accessing the message from a local process also running on the server computing system.

4. A method in accordance with claim 1, wherein the act of passing a data structure that represents at least a portion of the received message down through a software stack comprises the following:
   on act of passing a data structure that includes a text field down through the software stack such that the act of the module inserting error information comprises an act of the module inserting text error information that represents the error into the text field.

5. A method in accordance with claim 1, further comprising the following:
   an act of the module inserting text remedy information into the error data structure, the text remedy information describing one or more potential processes that may remedy the detected error.

6. A method in accordance with claim 1, wherein the data structure is the message.

7. A method in accordance with claim 1, wherein the message comprises a SOAP message.

8. A method in accordance with claim 7, wherein the text field is a header field within the SOAP message.

9. A method in accordance with claim 1, wherein the text field is a header field.

10. A method in accordance with claim 1,
   wherein the act of passing a data structure that represents at least a portion of the received message down through a software stack to a module that is capable of detecting errors in the data structure further comprises an act of a top layer module passing the data structure directly to the error detection module, and
   wherein the act of the error detection module returning and passing the error data structure with the inserted information back up the software stack comprises an act of the error detection module returning and passing the error data structure directly to the top layer module.

11. A method in accordance with claim 1,
   wherein the act of passing a data structure that represents at least a portion of the received message down through it software stack to a module that is capable of detecting errors in the data structure further comprises an act of a top layer module passing the data structure to the error detection module via one or more intermediary layer modules, and
   wherein the act of the error detection module returning and passing the error data structure with the inserted error information back up the software stack comprises an act of the error detection module returning and passing the error data structure to the top layer module via the one or more intermediary layer modules.

12. A method in accordance with claim 11, wherein the error detection module is a first error detection module, wherein the error information is first error information, wherein the error data structure is a first error data structure, and wherein one of the intermediary layer modules is a second error detection module that performs the following:
   an act of the second error detection module inserting second error information into a second error data structure; and
   an act of the second error detection module returning and passing the first and second error data structures back up through the software stack to the top layer module.

13. A method in accordance with claim 11, wherein the error detection module is a first error detection module, wherein the text error information is first error information, and wherein one of the intermediary layer modules is a second error detection module that performs the following:
   an act of the second error detection module inserting second error information into the error data structure; and
   an act of the second error detection module returning and passing the error data structure with the inserted first and second error information back up through the software stack to the top layer module.

14. A computer program product for use in a computing system that includes at least one processor and a memory capable of holding run-time software stacks that are created in response to the at least one processor executing computer-executable instructions, the computer program product for implementing a method for reporting detailed error information to a requesting entity regarding errors in a message, the computer program product comprising one or more physical computer-readable media having stored thereon the following:
   computer-executable instructions for accessing a message from a requesting entity;
   computer-executable instructions for passing a data structure that represents at least a portion of the received message down through a software stack to a module that is capable of detecting errors in the data structure;
   computer-executable instructions for the module detecting an error with the data structure;
   computer-executable instructions for the module inserting error information that represents the error into an error data structure;

computer-executable instructions for the error detection module returning and passing the error data structure with the inserted error information back up through the software stack; and computer-executable instructions for causing a response to the message to be sent along with a text field that includes a text representation of the error information back to the requesting entity.

15. A computer program product in accordance with claim 14, wherein the one or more physical computer readable media includes one or more of the following: memory, optical disk, or magnetic disk.

16. A computer program product in accordance with claim 14, wherein the computer-executable instructions for passing a data structure that represents at least a portion of the received message down through a software stack to a module that is capable of detecting errors in the data structure further comprise computer-executable instructions for a top layer module passing the data structure directly to the error detection module, and wherein the computer-executable instructions for the error detection module returning and passing the error data structure with the inserted error information back up the software stack comprise computer-executable instructions for the error detection module returning and passing the error data structure directly to the top layer module.

17. A computer program product in accordance with claim 14, wherein the computer-executable instructions for passing a data structure that represents at least a portion of the received message down through a software stack to a module that is capable of detecting errors in the data structure further comprise computer-executable instructions for a top layer module passing the data structure to the error detection module via one or more intermediary layer modules, and wherein the computer-executable instructions for the error detection module returning and passing the error data structure with the inserted text information back up the software stack comprise computer-executable instructions for the error detection module returning and passing the error data structure to the top layer module via the one or more intermediary layer modules.

18. A computer program product in accordance with claim 14, wherein the one or more physical computer-readable media further have stored thereon the following:

computer-executable instructions for the module inserting text remedy information into the error data structure, the text remedy information describing one or more potential processes that may remedy the detected error.

19. A computer program product in accordance with claim 14, wherein the one or more physical computer-readable media is just one computer-readable media.

* * * * *

UNITED STATES PATENT AND TRADEMARK OFFICE
CERTIFICATE OF CORRECTION

PATENT NO. : 7,036,052 B2 Page 1 of 1
APPLICATION NO. : 10/277446
DATED : April 25, 2006
INVENTOR(S) : Shaun D. Pierce et al.

It is certified that error appears in the above-identified patent and that said Letters Patent is hereby corrected as shown below:

In column 6, line 7, delete "runtime" and insert -- run-time --, therefor.

In column 9, line 44, in Claim 4, before "act" delete "on" and insert -- an --, therefor.

In column 10, line 11, in Claim 11, before "software" delete "it" and insert -- a --, therefor.

Signed and Sealed this

Thirtieth Day of March, 2010

David J. Kappos
*Director of the United States Patent and Trademark Office*